(12) United States Patent
Ideguchi et al.

(10) Patent No.: US 12,164,267 B2
(45) Date of Patent: Dec. 10, 2024

(54) PHASE IMAGING APPARATUS, PHASE IMAGING METHOD

(71) Applicant: THE UNIVERSITY OF TOKYO, Tokyo (JP)

(72) Inventors: Takuro Ideguchi, Tokyo (JP); Keiichiro Toda, Tokyo (JP); Miu Tamamitsu, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 282 days.

(21) Appl. No.: 17/895,411

(22) Filed: Aug. 25, 2022

(65) Prior Publication Data
US 2022/0404769 A1 Dec. 22, 2022

Related U.S. Application Data

(63) Continuation of application No. PCT/JP2021/005947, filed on Feb. 17, 2021.

(30) Foreign Application Priority Data

Feb. 27, 2020 (JP) .................. 2020-032168

(51) Int. Cl.
*G03H 1/00* (2006.01)
*G01N 21/45* (2006.01)
(Continued)

(52) U.S. Cl.
CPC ......... *G03H 1/0866* (2013.01); *G01N 21/453* (2013.01); *G03H 1/0005* (2013.01);
(Continued)

(58) Field of Classification Search
CPC .... G03H 1/0866; G03H 1/0005; G03H 1/024; G03H 1/0443; G01N 21/453; G01J 9/00; G02B 5/32; G01B 9/02
See application file for complete search history.

(56) References Cited

U.S. PATENT DOCUMENTS 10,162,161 B2 * 12/2018 Horstmeyer ......... G02B 21/361
2004/0021871 A1 * 2/2004 Psaltis ................... G01J 3/2823
356/451
(Continued)

FOREIGN PATENT DOCUMENTS

CN       104567659 A    4/2015
JP        2015118290 A    6/2015
(Continued)

OTHER PUBLICATIONS

Cuche et al., "Digital holography for quantitative phase-contrast imaging", Optics Letters, vol. 24, No. 5, Mar. 1, 1999, pp. 291-293.
(Continued)

*Primary Examiner* — Abdullahi Nur
(74) *Attorney, Agent, or Firm* — CANTOR COLBURN LLP

(57) ABSTRACT

A spatial modulator is provided on a plane conjugate to a sample plane on which a sample is to be placed. The spatial modulator spatially modulates illumination light irradiated to the sample 2 or object light that has passed through or that has been reflected by the sample. A dark-field optical system removes the non-scattered light component of the first object light affected by the spatial light modulator so as to generate second object light. An image sensor records a hologram based on the second object light. A calculation processing apparatus combines complex amplitude information based on the modulation pattern supplied to the spatial light modulator and complex amplitude information based on the hologram with respect to the second object light so as to acquire a phase distribution originating from the sample.

12 Claims, 13 Drawing Sheets

(51) Int. Cl.
*G03H 1/02* (2006.01)
*G03H 1/08* (2006.01)

(52) U.S. Cl.
CPC ....... *G03H 1/024* (2013.01); *G03H 2001/005* (2013.01); *G03H 2240/13* (2013.01)

(56) References Cited

U.S. PATENT DOCUMENTS

| | | | | |
|---|---|---|---|---|
| 2005/0254108 | A1* | 11/2005 | Chuang | G11C 13/042 |
| 2009/0303559 | A1* | 12/2009 | Rosen | G03H 1/0005 |
| | | | | 359/9 |
| 2011/0043816 | A1* | 2/2011 | Watanabe | G03H 1/0005 |
| | | | | 356/457 |
| 2015/0205260 | A1* | 7/2015 | Awatsuji | G03H 1/0443 |
| | | | | 348/40 |
| 2015/0268628 | A1* | 9/2015 | Sato | G01B 9/02091 |
| | | | | 356/457 |
| 2016/0011564 | A1* | 1/2016 | Tanabe | G03H 1/0443 |
| | | | | 359/11 |
| 2016/0061750 | A1* | 3/2016 | Den Boef | G03H 1/0443 |
| | | | | 356/496 |
| 2017/0242398 | A1* | 8/2017 | Brooker | A61B 3/13 |
| 2018/0266806 | A1* | 9/2018 | Cheng | A61B 5/0073 |

FOREIGN PATENT DOCUMENTS

| | | |
|---|---|---|
| JP | 2018008040 A | 1/2018 |
| WO | 2018070451 A1 | 4/2018 |

OTHER PUBLICATIONS

Dubois et al., "Dark-field digital holographic microscopy to investigate objects that are nanosized or smaller than the optical resolution", Optic Letters, vol. 33, No. 22, Nov. 15, 2008, pp. 2605-2607.
International Search Report for International Application No. PCT/JP2021/005947; Date of Mailing, May 11, 2021.
PCT International Preliminary Report on Patentability with Written Opinion of the International Searching Authority for International Application No. PCT/JP2021/005947; Date of Mailing, Aug. 20, 2022.
Toda et al., "Adaptive dynamic range shift (ADRIFT) quantitative phase imaging", Light: Science & Applications, 10:1, 2021, 10 pages.
Verpillat et al., "Dark-field digital holographic microscopy for 3D-tracking of gold nanoparticles", Optics Express, vol. 19, No. 27, Dec. 19, 2011, 12 pages.
JPO Notification of Reasons for Refusal for corresponding JP Application No. 2020-032168; Mailing Date, Oct. 17, 2023.

* cited by examiner

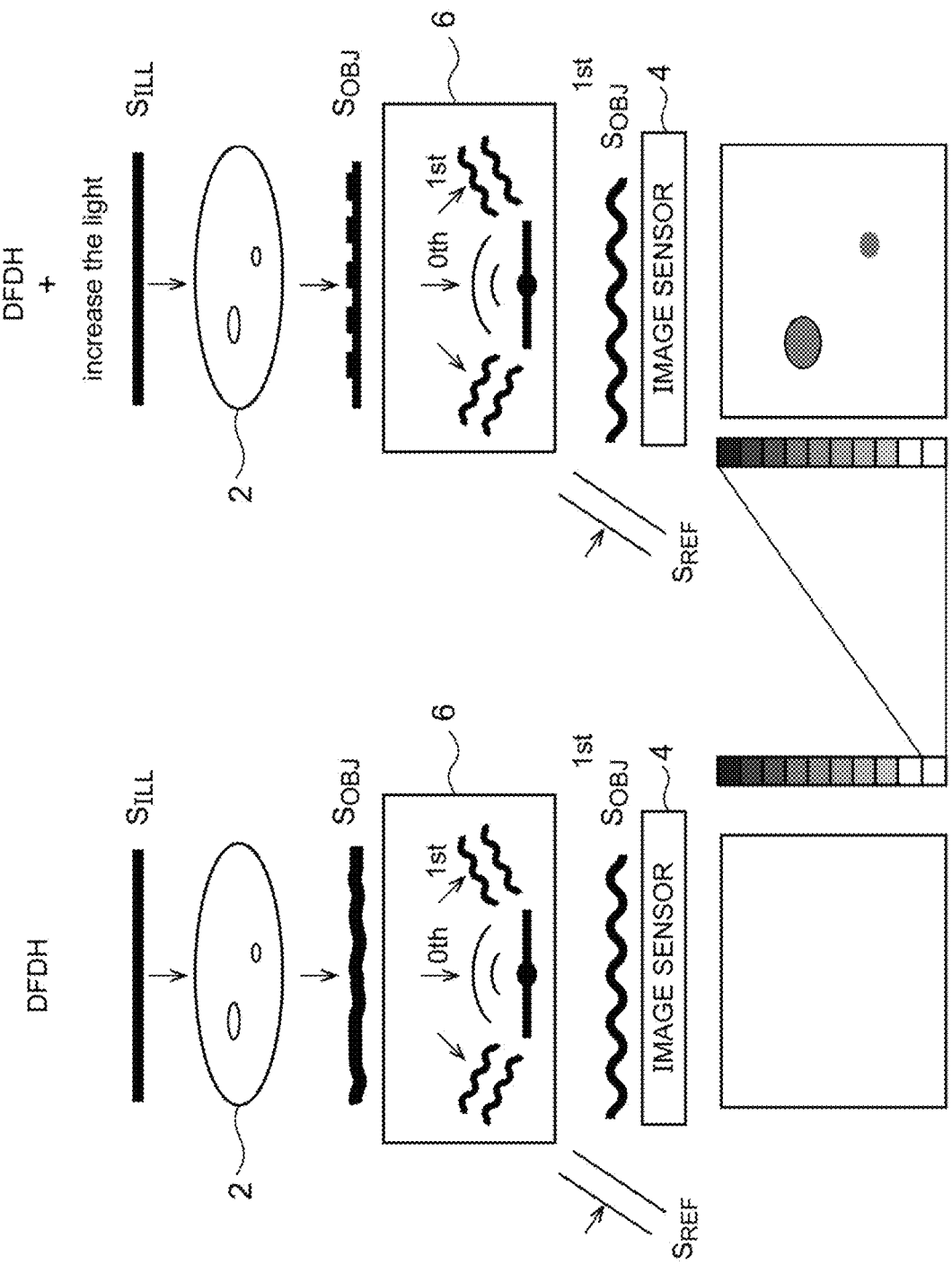

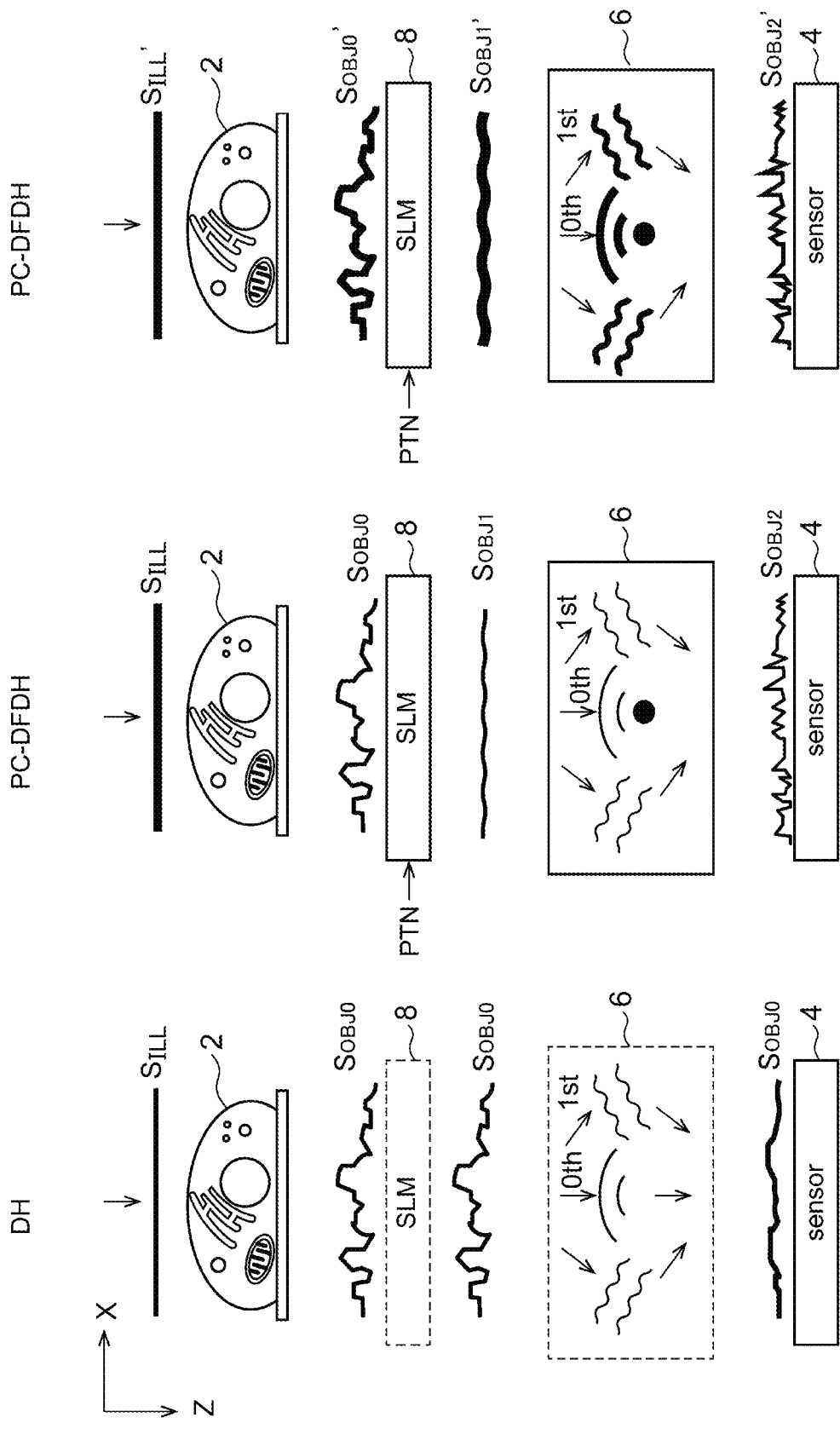

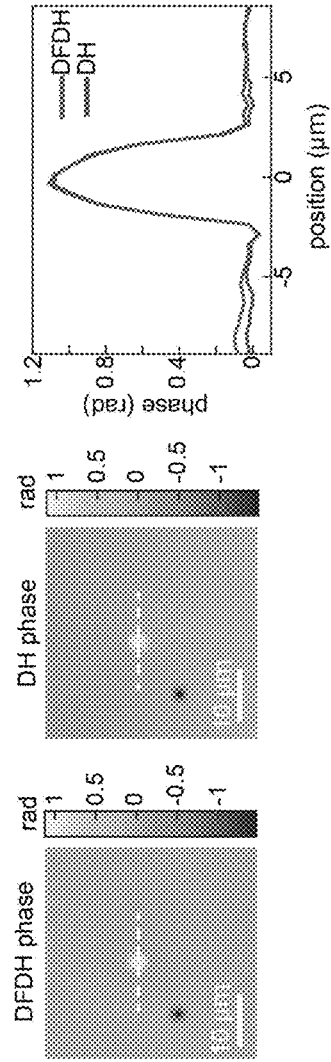
FIG. 8A
FIG. 8B
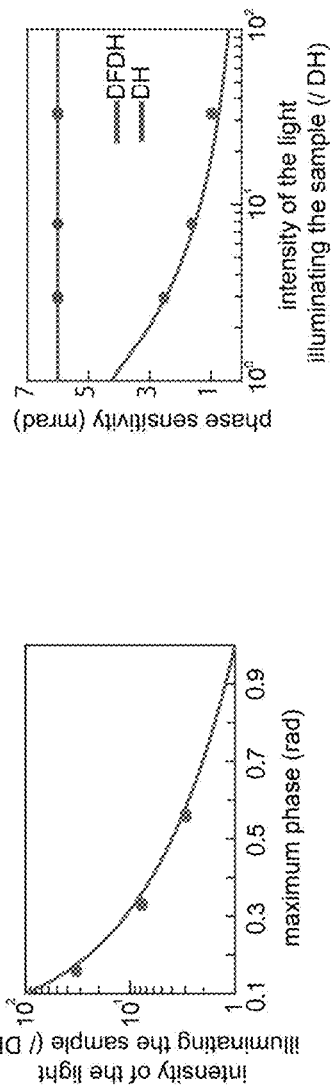
FIG. 8C
FIG. 8D

PHASE IMAGING APPARATUS, PHASE IMAGING METHOD

CROSS REFERENCE TO RELATED APPLICATIONS

This application is a continuation under 35 U.S.C. § 120 of PCT/JP2021/005947, filed Feb. 17, 2021, which is incorporated herein by reference, and which claimed priority to Japanese Application No. 2020-032168, filed Feb. 27, 2020. The present application likewise claims priority under 35 U.S.C. § 119 to Japanese Application No. 2020-032168, filed Feb. 27, 2020, the entire content of which is also incorporated herein by reference.

BACKGROUND

1. Technical Field

The present disclosure relates to phase imaging.

2. Description of the Related Art

In order to visualize a transparent object with high contrast, phase imaging has been employed. Among these techniques, Quantitative Phase Imaging (QPI) is capable of acquiring the complex amplitude distribution of light modulated by an object, unlike in conventional phase contrast microscopy, dark-field microscopy, or differential interference microscopy (Non-patent document 1: E. Cuche et al., "Digital holography for quantitative phase-contrast imaging", Optics Letters 24(5), 291-293 (1999)). Using the advantage of providing quantitative data, QPI is employed in order to investigate the dry mass density in cells, or in order to investigate defects in a semiconductor wafer.

With QPI, a wide dynamic range is very important. For example, in a case of observing a sample that can be destroyed in laser machining, in a case in which a moving object is to be observed using flow cytometry or the like, or in a case in which a small change in cells due to intracellular dynamics is to be observed, there is a need to acquire an image with a high S/N ratio in a single-shot manner without image integration. Digital Holography (DH) is a typical method for providing QPI. With conventional digital holography techniques, by stabilizing an interferometer, this allows measurement to be made with precision at the shot noise limit. This provides phase detection sensitivity on the order of 10 mrad using an ordinary CMOS image sensor with a pixel saturation charge on the order of 10000 $e^{-1}$.

Description will be made regarding QPI using the digital holography technique. FIG. 1 is a diagram for explaining digital holography. Illumination light $S_{ILL}$ which is a plane wave is irradiated to a sample 2 which is a phase object. When the illumination light $S_{ILL}$ passes through (or is reflected by) the sample 2, the illumination light $S_{ILL}$ is spatially phase-modulated due to the depth integration of the internal refractive index distribution (or unevenness in the depth direction) so as to change the wavefront thereof, thereby generating object light $S_{OBJ}$ including phase information. The intensity distribution of the interference fringe generated by the object light $S_{OBJ}$ and the reference light $S_{REF}$ which is a plane wave is recorded as a hologram by means of an image sensor 4. The hologram is subjected to calculation processing so as to reconstruct the phase distribution of the object light $S_{OBJ}$. The phase distribution represents the quantitative phase change distribution that occurs due to the sample 2.

With conventional techniques, QPI detection sensitivity is limited by shot noise. In a weak-phase object, the intensity of the scattered light component (1st-order diffracted light) including the sample information is very small as compared with non-scattered light component (0th-order diffracted light) including no sample information. Accordingly, with such conventional techniques, the dynamic range is limited due to shot noise that occurs in the non-scattered light. In order to solve this problem, it is important for the image sensor to acquire the scattered light component including information originating from the sample as much as possible for each frame.

In order to weaken the non-scattered light component, dark-field digital holography has been proposed (Non-patent document 2: F. Verpillat et al., "Dark-field digital holographic microscopy for 3D-tracking of gold nanoparticles", Optics Express 19(27), 26044-26055 (2011)). It should be noted that this method is by no means to be regarded as a known technique. FIG. 2A and FIG. 2B are diagrams for explaining digital holography adopting a dark-field imaging method.

FIG. 2A shows a combination of dark-field (DF) imaging and digital holography (which is referred to as "DFDH"). The object light $S_{OBJ}$ is separated by a dark-field optical system 6 such as a reflective objective lens or the like into a non-scattered light component (0th-order diffracted light) which is not subject to phase change (background light) and a scattered light component (1st-first order diffracted light) including the sample information. The non-scattered light component is shielded. In contrast, only the scattered light component $S_{OBJ}'$ including the sample information is incident to an image sensor and forms an interference fringe together with reference light $S_{REF}$.

As described above, with the DFDH method, this is capable of raising the intensity ratio of the scattered light component with respect to the non-scattered light component. Accordingly, by increasing the amount of the illumination light to be irradiated to the sample 2, this allows the image sensor to acquire an increased amount of phase information originating from the sample for each frame. FIG. 2B shows the same optical system as shown in FIG. 2A in which the illumination light $S_{ILL}$ is irradiated with an increased intensity.

FIG. 3A is a diagram showing a dynamic range shift provided by the technique shown in FIG. 2. The left-side drawing in FIG. 3A shows a phase change distribution (one-dimensional distribution) originating from the sample. This phase change distribution includes a phase component smaller than the level detectable by ordinary digital holography. With DFDH, as shown in the right-side drawing in FIG. 3A, this allows a small phase component to be enlarged and observed. For example, with the technique shown in FIG. 2, in a case in which the phase component in the field of view has a maximum phase of 0.1 rad, this is capable of shifting the upper limit of the dynamic range to 0.1 rad, thereby allowing small phase imaging to be provided with a single measurement.

FIG. 3B is a diagram showing another example of the phase change distribution originating from a sample. This sample includes an object that differs from a weak-phase object in a portion A in the field of view. With the DFDH method, saturation occurs in the pixels of the image sensor that correspond to the portion A. Accordingly, the illumination light $S_{ILL}$ to be irradiated to the sample cannot be increased, and the dynamic range cannot be shifted.

That is to say, in almost all cases, the non-scattered light component intensity handling supported by DFDH can be effectively employed for only limited applications in which an artificially created sample is observed, such as a case in which microparticles on a cover glass are to be observed. In addition, no method has been established in which a non-scattered light component is weakened so as to provide quantitative phase imaging.

SUMMARY

The present disclosure has been made in view of such a situation. Accordingly, it is an exemplary purpose of an embodiment of the present disclosure to provide an imaging apparatus with an extended dynamic range and an imaging method thereof.

With an imaging apparatus/method according to an embodiment, a spatial light modulator is inserted in a light path. With this, a modulation pattern to be supplied to the spatial light modulator is optimized so as to cancel a large phase component of the object light. Subsequently, only a small phase shift distribution is measured with high sensitivity using strong illumination. Subsequently, the small phase shift distribution and the large phase distribution thus canceled are combined so as to generate a phase image with a wide dynamic range.

It is to be noted that any arbitrary combination or rearrangement of the above-described structural components and so forth is effective as and encompassed by the present embodiments. Moreover, this summary does not necessarily describe all necessary features so that the disclosure may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2A and FIG. 2B are diagrams for explaining digital holography using a dark-field imaging method.

FIG. 4A through FIG. 4C are diagrams each showing a quantitative phase imaging apparatus according to an embodiment.

FIG. 8A through FIG. 8D are diagrams showing experimental results.

DETAILED DESCRIPTION

Figure 1:
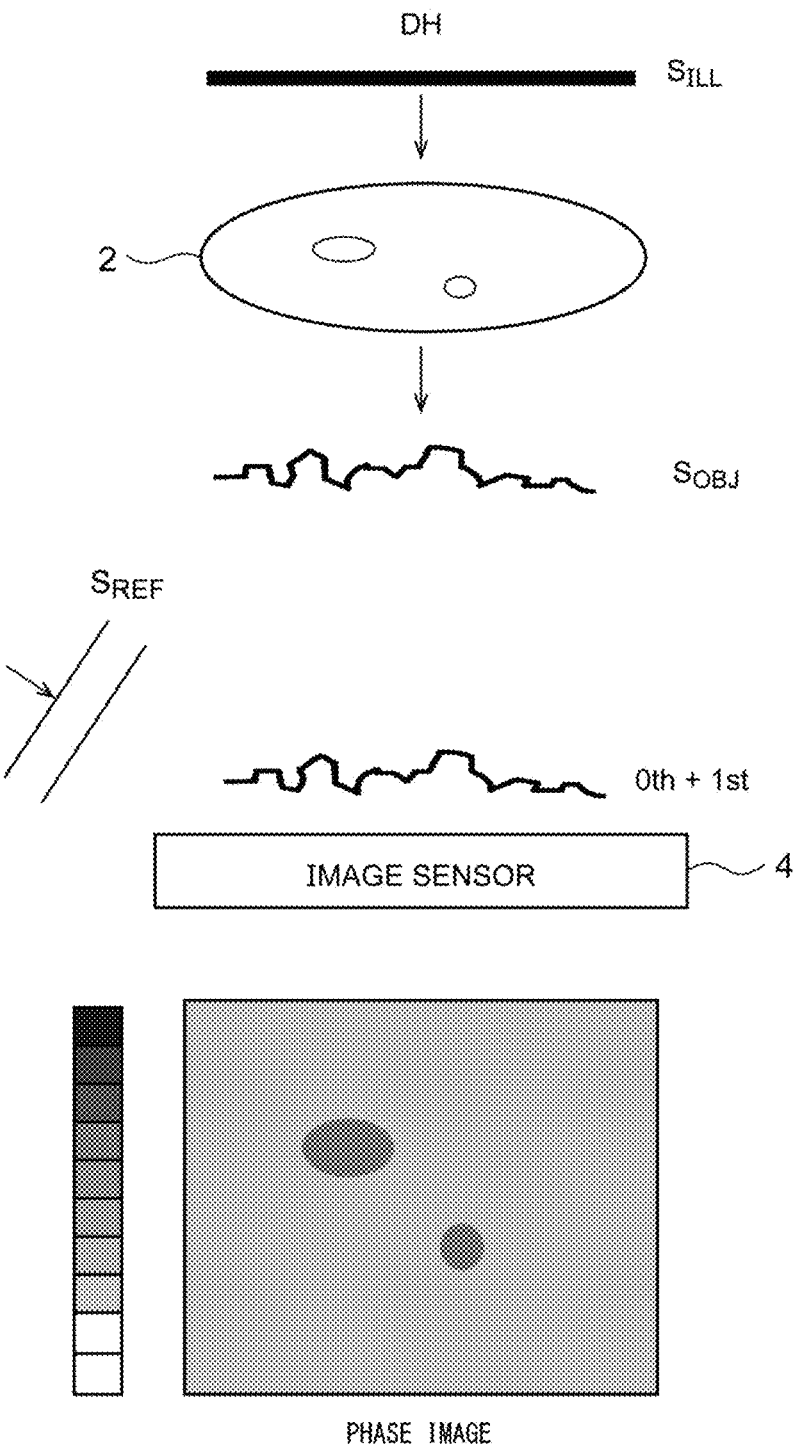
FIG. 1 is a diagram for explaining digital holography.
Figure 3A:
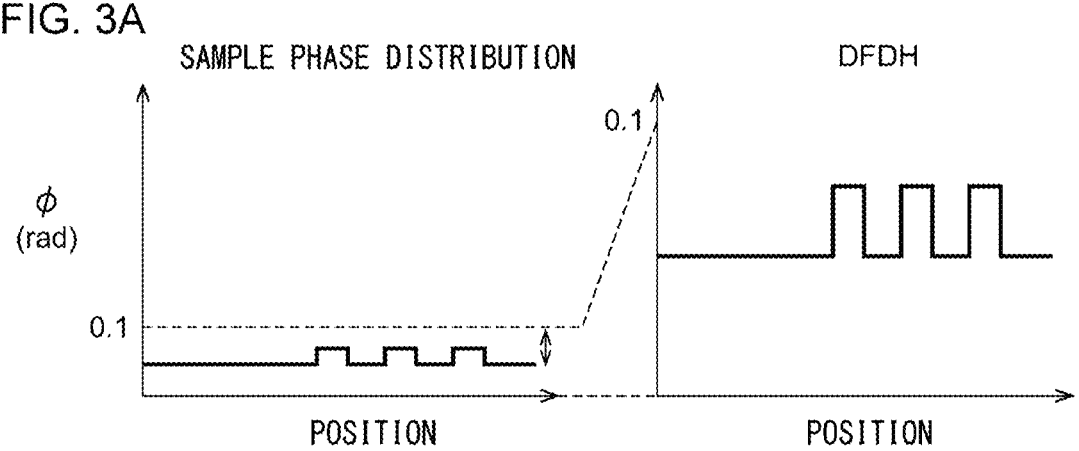
FIG. 3A is a diagram showing the dynamic range shift using the technique shown in FIG. 2.
Figure 3B:
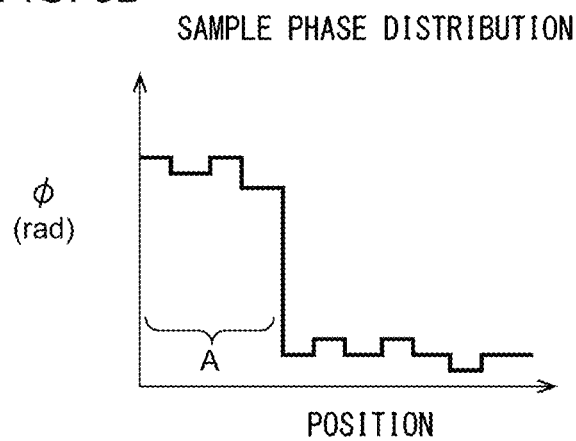
FIG. 3B is a diagram showing another example of the phase change distribution originating from a sample.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

Outline of Embodiments

A phase imaging apparatus according to one embodiment includes a spatial light modulator, a dark-field optical system, an image sensor, and a calculation processing apparatus. The spatial light modulator is provided on a plane conjugate to the sample plane and is configured to be capable of spatially modulating illumination light to be irradiated to a sample or object light that has passed through or that has been reflected by the sample. The dark-field optical system removes the non-scattered light component included in the first object light affected by the spatial light modulator so as to generate second object light. The image sensor records a hologram with respect to the second object light. The calculation processing apparatus combines complex amplitude information based on the modulation pattern supplied to the spatial light modulator and complex amplitude information based on the hologram with respect to the second object light, so as to reconstruct phase information with respect to the sample.

With this configuration, by optimizing the modulation pattern, this allows the phase shift originating from the sample to be canceled with coarse precision (Phase Canceling: PC). In such a phase-canceled state, only a small phase component remains. Accordingly, this allows the illumination light to be irradiated with a strong intensity in the subsequent dark-field measurement as compared with a case in which the phase cancellation is not provided. Based on a hologram acquired in this state, this arrangement is capable of calculating a remaining small spatial phase distribution. Furthermore, the large spatial phase distribution thus canceled by the phase cancellation can be calculated based on the modulation pattern. Finally, the two phase components are combined so as to acquire a quantitative phase shift originating from the sample. With this apparatus, this supports both a wide dynamic range and high sensitivity. It should be noted that "removing a non-scattered light component" does not only include completely removing the non-scattered light component, but also includes attenuation of the non-scattered light component.

Also, the image sensor may record a hologram with respect to third object light acquired in a state in which the dark-field optical system is disabled, and a flat pattern is supplied to the spatial light modulator. The modulation pattern may be generated based on the hologram with respect to the third object light.

Also, the modulation pattern may be optimized such that the intensity of light incident to the image sensor is minimized in a state in which the dark-field optical system is enabled.

Also, the modulation pattern may be optimized such that a non-scattered light component of the first object light is maximized.

The dark-field optical system may include a focusing optical system and a mask provided on a Fourier plane of the focusing optical system. The non-scattered light component, which is a component that has not been affected by phase modulation due to the sample, is a plane wave. Accordingly, the non-scattered light component is focused at a focal point by means of a focusing optical system. Accordingly, by removing the light thus focused at the focal point, this allows the non-scattered light component to be removed.

The phase imaging apparatus may be configured using a phase imaging technique that enables single-shot measurement. Examples of such techniques include off-axis digital holography and diffraction imaging each configured to measure an interference fringe formed on the image sensor due to the object light and the reference light.

The phase imaging apparatus may be configured using a phase imaging technique using a phase shift method. For example, the phase imaging apparatus may be configured as a phase-shift-type digital holography apparatus configured to record an interference fringe formed due to the object light and the reference light incident to the image sensor in the same axial direction while shifting the phase of the reference light. Also, the phase imaging apparatus may be configured using a spatial light interference microscopy (SLIM) type self-reference phase shift method. In a case of employing such a SLIM method, the phase imaging apparatus includes: a first spatial light modulator provided on a plane conjugate to the sample plane so as to cancel the phase delay that occurs due to the sample; a second spatial light modulator configured to attenuate the intensity of the non-scattered light of the object light including the sample phase information and to shift the phase thereof; an image sensor configured to record a hologram based on the object light; and a calculation processing apparatus configured to combine the complex amplitude information based on the modulation pattern supplied to the spatial light modulator and the complex amplitude information based on the hologram recorded by the image sensor so as to acquire the sample phase information. It should be noted that, unlike the DF method in which the non-scattered light is shielded, the non-scattered light is attenuated.

The phase imaging may be supported using a phase imaging technique employing a phase retrieval method. For example, an apparatus may be configured to retrieve the phase of the electromagnetic wavefront after it acquires the diffraction intensity pattern for each condition while scanning the focal position of the target on the image sensor or the angle of the illumination light to be irradiated to the target.

The phase imaging apparatus may be configured as an optical diffraction tomography or synthetic aperture imaging apparatus using the phase imaging technique described above. For example, the phase imaging apparatus may be configured as an optical diffraction tomography or synthetic aperture imaging apparatus based on a mechanism for irradiating patterned illumination light while changing the irradiation angle. The spatial light modulator may also be configured as a patterning device for patterning the illumination light. The dark-field optical system may include a digital micromirror device (DMD) or a movable mask provided on the focal plane of the lens. With such an optical diffraction tomography or synthetic aperture imaging apparatus, the focal position of the non-scattered light is shifted according to the irradiation angle of the illumination light. This allows the light shielding position to be shifted according to the irradiation angle.

Embodiments

Description will be made below regarding the present disclosure with reference to the drawings. In each drawing, the same or similar components, members, and processes are denoted by the same reference numerals, and redundant description thereof will be omitted as appropriate. The embodiments have been described for exemplary purposes only and are by no means intended to restrict the present disclosure. Also, it is not necessarily essential for the present disclosure that all the features or a combination thereof be provided as described in the embodiments.

Principle

Figure 5:
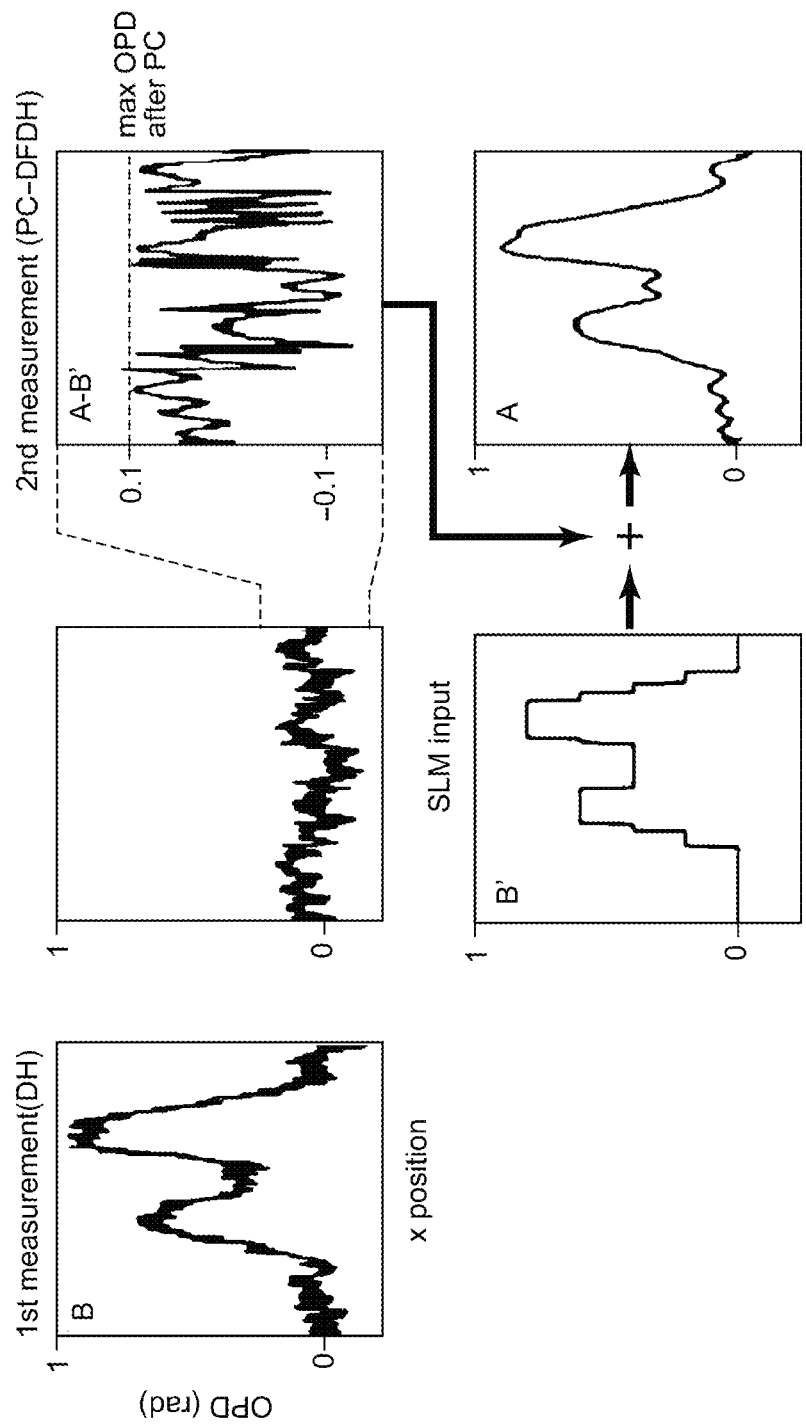
FIG. 5 is a diagram for explaining processing of the quantitative phase imaging apparatus according to an embodiment.

Description will be made with reference to FIGS. 4A through 4C and FIG. 5 regarding the principle of quantitative phase imaging according to an embodiment. FIG. 4A through FIG. 4C are diagrams each showing a quantitative phase imaging apparatus according to an embodiment. FIG. 5 is a diagram for explaining the operation of the quantitative phase imaging apparatus according to the embodiment.

As shown in FIG. 4A through FIG. 4C, the quantitative phase imaging apparatus mainly includes an image sensor 4, a dark-field optical system 6, a spatial light modulator 8, and an unshown calculation processing apparatus (computer). The spatial light modulator 8 is inserted in the light path of the object light. Furthermore, the dark-field optical system 6 is configured to be capable of removing the non-scattered light component of the object light $S_{OBJ}$ affected by the spatial light modulator 8.

In this imaging, two measurements are executed. In the first measurement, ordinary digital holography measurement is executed as shown in FIG. 4A. With this, the phase distribution of the object light $S_{OBJ}$ is measured with coarse precision. In the second measurement, DFDH measurement with phase cancelation is executed using the strong illumination light shown in FIG. 4C.

FIG. 4A is a diagram showing the first image acquisition using ordinary digital holography (DH). In this operation, a uniform pattern is applied to the spatial light modulator 8 so as to disable the operation thereof. Furthermore, the dark-field optical system 6 is also disabled so as to allow the non-scattered light component to pass through.

The coherent illumination light $S_{ILL}$ is irradiated to the sample 2. When the illumination light $S_{ILL}$ passes through (or is reflected by) the sample 2, such an arrangement generates object light $S_{OBJ0}$ including the phase change distribution originating from the sample 2. The object light $S_{OBJ0}$ and reference light (not shown) which is a plane wave form an interference fringe on the image sensor 4. The intensity distribution of the interference fringe is recorded by the image sensor 4 as a hologram. By applying calculation processing to the hologram, the quantitative phase change distribution B originating from the sample 2 shown in FIG. 5 is reconstructed. The phase distribution B has small phase components buried in noise. Accordingly, the phase distribution B represents a coarse phase change distribution of the sample 2.

As shown in FIG. 4B, a modulation pattern PTN is applied to the spatial light modulator 8 so as to cancel the phase distribution B acquired in the first measurement. This modulation pattern PTN can be obtained by inverting the phase advance/delay of the phase distribution B. Such a measurement will be referred to as "Phase Canceling-Dark Field Digital Holography (PC-DFDH) measurement". FIG. 5 shows a phase distribution B' provided by the spatial light modulator 8. The phase distribution B' can be regarded as a phase distribution obtained by discretizing the phase distribution B based on the gradations of the spatial light modulator 8 so as to quantize the phase distribution B.

The object light (which will also be referred to as "first object light" or "phase-canceled object light") $S_{OBJ1}$ thus subjected to phase cancelation by the spatial light modulator 8 becomes similar to a plane wave having a non-scattered light component as a dominant component. The object light $S_{OBJ1}$ is input to the dark-field optical system 6 so as to remove the non-scattered light component, and the object light (which will also be referred to as "second object light" or "small phase object light") $S_{OBJ2}$ having the scattered light component as a dominant component is incident to the image sensor 4. The hologram formed based on the second object light $S_{OBJ2}$ represents a phase distribution A-B' obtained by subtracting the phase distribution B' applied by the spatial light modulator 8 from the original phase distribution A originating from the sample. However, in this case, the scattered light component has a weak intensity. Accordingly, the image sensor 4 is not able to measure a significant interference fringe.

In order to solve such a problem, in the second measurement, as shown in FIG. 4C, PC-DFDH measurement is executed with illumination light having an increased intensity. With this, the amplitude of the scattered light component of the second object light $S_{OBJ2}$' incident to the image sensor 4 is increased. This allows the image sensor 4 to measure the interference fringe (hologram), thereby acquiring the small phase distribution A-B'.

The phase distribution A-B' based on the hologram obtained in the second measurement represents a distribution of remaining small phase components that have not been canceled from the phase distribution A originating from the sample 2. As shown in FIG. 5, the phase distribution B' applied by the spatial light modulator 8 and the phase distribution A-B' obtained in the second measurement are combined, thereby obtaining a correct phase distribution A originating from the sample 2.

With this method, this allows the dynamic range to be extended. In addition, this allows a small change of the phase included in the dynamic range to be detected.

Description has been made above regarding an arrangement in which a phase spatial light modulator (phase only SLM) is employed as the spatial light modulator 8 so as to cancel the phase originating from the sample. Also, a spatial light modulator that supports amplitude modulation may be provided as an additional component. In a case in which various kinds of samples are actually measured, in some cases, amplitude modulation occurs in the light wavefront in addition to phase modulation due to the effects of diffraction or light absorption in the sample. In such cases, in some cases, the wavefront does not return to a plane wave even if only the phase is canceled. Accordingly, in some cases, such an arrangement is not capable of providing a sufficient dynamic range shift in the dark field. In order to solve such a problem, SLM that supports amplitude modulation is provided as an additional component, thereby allowing this problem to be solved. Instead of the phase spatial light modulator and the amplitude spatial light modulator, an integrated modulator (complex amplitude modulator) may be employed.

Description has been made above regarding an arrangement in which an ordinary DH measurement (FIG. 4A) is executed in order to generate the modulation pattern PTN to be used for phase cancelation, and the modulation pattern PTN (B') is acquired by calculation. However, the present invention is not restricted to such an arrangement.

Also, the first measurement for generating the modulation pattern PTN may be executed in a state in which the dark-field optical system 6 is enabled as shown in FIG. 4B. Also, the modulation pattern PTN may be optimized such that the light intensity to be incident to the image sensor 4 is minimized. From another viewpoint, the modulation pattern PTN may be optimized such that the non-scattered light component of the first object light $S_{OBJ1}$ is maximized.

Also, in a case in which the sample 2 is an industrial product or the like, i.e., in a case in which the object light originating from the sample 2 has a known phase distribution, the first measurement to be used for generating the modulation pattern PTN may be omitted.

The present invention encompasses various kinds of apparatuses and methods that can be derived from the aforementioned description. That is to say, the phase imaging apparatus may be configured using various kinds of known architectures of various kinds of digital holography apparatuses. More specific description will be made below regarding example configurations or examples for clarification and ease of understanding of the essence of the present invention and the operation thereof. That is to say, the following description is by no means intended to restrict the technical scope of the present invention.

Example 1

Figure 6:
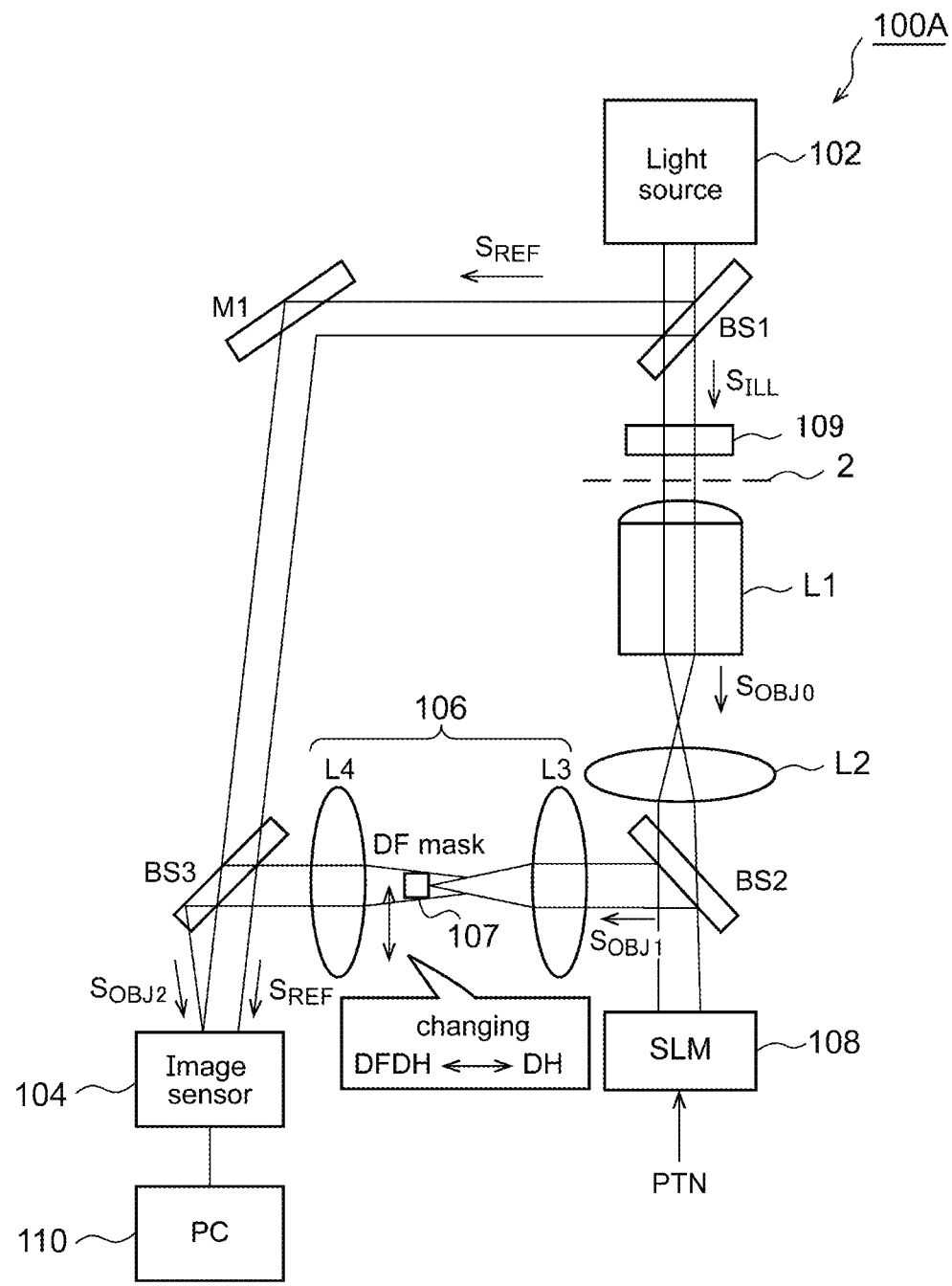
FIG. 6 is a diagram showing a phase imaging apparatus according to an example 1.

FIG. 6 is a diagram showing a phase imaging apparatus 100A according to an Example 1. The phase imaging apparatus 100A is configured as an off-axis-type digital holography apparatus including a light source 102, an image sensor 104, a dark-field optical system 106, a spatial light modulator 108, a calculation processing apparatus 110, beam splitters BS1 through BS3, a mirror M1, and lenses L1 and L2.

The output light of the light source 102 is split by the beam splitter BS1 into reference light $S_{REF}$ and illumination light $S_{ILL}$. The reference light $S_{REF}$ is input to the image sensor 104 via the mirror M1 and the beam splitter BS3.

The illumination light $S_{ILL}$ is irradiated to the sample 2. A variable neutral density (ND) filter 109 can be inserted between the sample 2 and the beam splitter BS1. The variable ND filter 109 allows the intensity of the illumination light $S_{ILL}$ to be adjusted.

After the object light $S_{OBJ}$ passes through the sample 2, the object light $S_{OBJ}$ passes through the objective lens L1 and the lens L2. The spatial light modulator 108 is configured as a phase spatial light modulator (phase-only SLM) provided for wavefront adjustment (phase cancelation). The spatial light modulator 108 is inserted on a plane conjugate to the sample 2 and is configured to be capable of spatially modulating the object light $S_{OBJ}$ based on the modulation pattern PTN. The modulated object light $S_{OBJ\_PC}$ is input to the dark-field optical system 106. The spatial light modulator 108 may be configured as a transmissive device or a reflective device.

The configuration of the dark-field optical system 106 is not restricted in particular. For example, the dark-field optical system 106 may include a focusing optical system and a mask. In this example, the focusing optical system includes lenses L3 and L4 and a mask 107. The mask 107 is provided on the Fourier plane of the lens L3. The non-scattered light component, which is a plane wave, is focused by the lens L3, and is removed by the mask 107. On the other hand, the remaining scattered light component passes through the dark-field optical system 106. The mask 107 is movable in a direction that is orthogonal to the optical axis. This allows the dark-field optical system 106 to be disabled by removing the mask 107 from the optical axis. It should be noted that a concave mirror may be employed as the focusing optical system.

After the second object light $S_{OBJ2}$ passes through the dark-field optical system 106, the second object light $S_{OBJ2}$ is reflected by the beam splitter BS3 and is guided to the image sensor 104. There is a slight difference between the incident angle of the second object light $S_{OBJ2}$ and the incident angle of the reference light $S_{REF}$ with respect to the image sensor 104.

In the first measurement, the mask 107 is removed from the optical axis so as to execute the measurement using an ordinary DH setup. In the second measurement, the mask 107 is arranged on the optical axis so as to execute the measurement using a DFDH setup. In this measurement, the transmittance of the variable ND filter is increased so as to increase the intensity of the illumination light $S_{ILL}$.

In the first measurement, the image sensor 104 records the intensity distribution of the interference fringe formed on a sensor surface thereof due to the object light $S_{OBJ}$ and the reference light $S_{REF}$ as a hologram.

The calculation processing apparatus 110 combines the complex amplitude information based on the modulation pattern PTN applied to the spatial light modulator 108 and the complex amplitude information based on the hologram recorded by the image sensor 104, so as to acquire the phase information with respect to the sample 2.

With this arrangement, the reference light $S_{REF}$ is incident to the image sensor 104. Accordingly, this enables heterodyne detection using a dark-field imaging method in addition to DFDH measurement. With this, even if the light incident to the detector (image sensor 104) decreases after the phase cancellation, this allows the noise limit of the detector to be avoided. This provides improved phase detection sensitivity as compared with conventional dark-field imaging.

Furthermore, by making a sufficient amount of reference light incident to the image sensor 104, this enables measurement with precision at the shot-noise limit. In principle, the interference between the object light and the reference light can be measured in the same manner as with interferometric scattering microscopy (iSCAT). This method allows nano-scale dynamics to be visualized with high sensitivity.

In a case in which a given sample has a large phase structure that moves slowly, the phase (modulation pattern) to be applied to the spatial light modulator 108 is not required to be updated every time. That is to say, the same modulation pattern can be used for some time.

Regarding Phase Detection Sensitivity

Description will be made regarding the phase detection sensitivity in the phase imaging apparatus 100 according to an embodiment. Description will be made ignoring situations in which Rayleigh scattering should be taken into account. However, it should be noted that the imaging apparatus/method according to the embodiment is also effectively applicable to a usage that is affected by Rayleigh scattering.

Description will be made assuming that the illumination light has a uniform amplitude distribution, which is represented by $U_0$. The phase delay map that occurs due to a sample is represented by $\theta_{mn}$ ($m \in [0, M-1]$, $n \in [0, N-1]$). With this, the complex amplitude provided by the image sensor is represented by $U_0 e^{i\theta_{mn}}$. Here, M and N correspond to the pixel numbers in the horizontal direction and the vertical direction, respectively.

In DF imaging, the intensity provided by the image sensor 104 is represented by $|U_0(e^{i\theta_{mn}}-1)|^2$. In a case in which the maximum phase $\theta_{max}$ in the field of view (FOV) becomes $\theta_{max} \ll 1$ by phase canceling, the maximum DF intensity is represented by the following Expression (1).

$$|U_0(e^{i\theta_{max}}-1)|^2 = 2U_0^2(1-\cos\theta_{max}) \sim U_0^2\theta_{max}^2 \quad (1)$$

Furthermore, in the second measurement (PC-DFDH measurement), the intensity of the illumination light $S_{ILL}'$ to be irradiated to the sample can be increased up to $1/\theta_{max}^2$ times the intensity of the illumination light $S_{ILL}$ to be used in ordinary DH measurement. This is because the DH intensity supplied from the sample arm is $|U_0 e^{i\theta_{mn}}| = U_0^2$.

Description will be made regarding a comparison between PC-DFDH measurement and DH measurement. With the off-axis interference method, in a case in which the amplitude provided by one arm is the same as that provided by the other arm, this provides the maximum detection sensitivity. In the image sensor, the DH intensity $I_{mn}^{DH}$ and the PC-DFDH intensity $I_{mn}^{PC-DFDH}$ are represented by the following Expressions (2) and (3), respectively.

[Expression 2]

$$I_{mn}^{DH} = |U_0|^2 |e^{i\theta_{mn}} + e^{i(kMm+kNn)}|^2 \quad (2)$$

[Expression 3]

$$I_{mn}^{PC-DFDH} = |U_0|^2 |\{e^{i\theta_{mn}}-1\}\sqrt{\alpha} + e^{i(kMm+kNn)}|^2 \quad (3)$$

Here, $U_0$ represents the complex amplitude of the reference light. The phase term added due to the off-axis optical system is represented by $k_{Mm} + k_{Nn}$.

Description will be made with reference to Expression 2 assuming that illumination light is irradiated with a high intensity that is $\alpha (1 \leq 1/\theta_{max}^2)$ times the intensity in DH measurement. In this case, the relation between the phase detection sensitivity $\delta\theta^{PC-DFDH}_{mn}$ in PC-DFDH measurement and the phase detection sensitivity $\delta\theta^{DH}_{mn}$ in DH measurement is represented by the following Expression (4). Here, an approximation of $\theta_{mn}/\theta_{max} \approx 0$ is used.

[Expression 4]

$$\delta\theta^{PC-DFDH}_{mn} \sim 1/\sqrt{2\alpha} \cdot \delta\theta^{DH}_{mn} \quad (4)$$

With PC-DFDH measurement, the phase detection sensitivity increases due to two factors. The first factor is that the light intensity to be irradiated to the image sensor is reduced as a result of introducing the DF measurement. This reduces the shot noise. In a case in which the approximation $\theta_{mn}/\theta_{max} \approx 0$ can be used, this provides improved sensitivity on the order of $\sqrt{2}$. The second factor is the dynamic range shift. This provides improved sensitivity on the order of $\sqrt{\alpha}$. This is because the shot noise is $\sqrt{\alpha}$ times smaller as compared with DH measurement.

EXPERIMENTAL RESULTS

Description will be made regarding experimental results with the phase imaging apparatus 100A. It should be noted that this experiment provides the first experiment results of quantitative phase imaging employing the dark-field imaging method. As a sample, silica microbeads each having a diameter of 5 μm were employed.

Figure 7A:
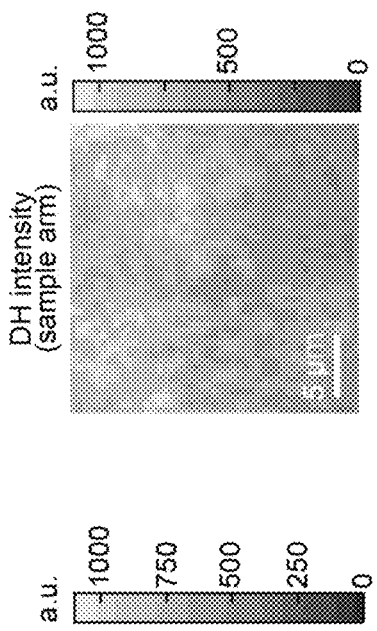
FIG. 7A through FIG. 7C are diagrams showing experimental results.
Figure 7B:
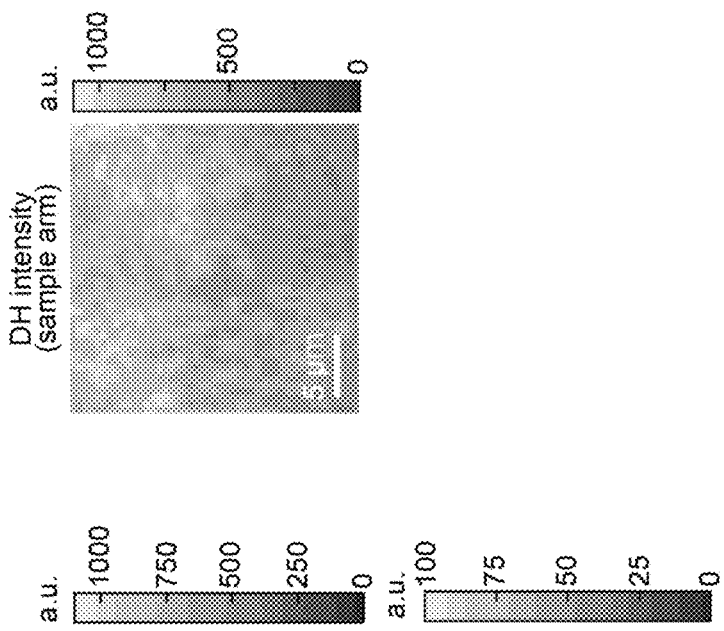
Figure 7C:
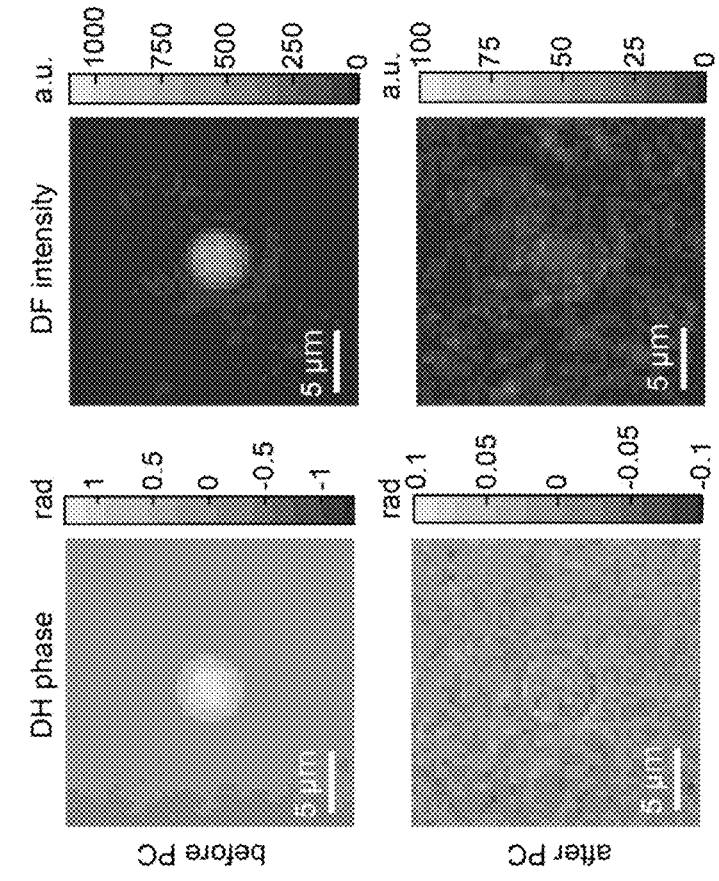

First, the phase cancelation results were verified. FIG. 7A through FIG. 7C are diagrams showing the experimental results. FIG. 7A is a diagram showing a phase image acquired in DH measurement. FIG. 7B is a diagram showing the intensity image acquired in DF measurement. FIG. 7C shows the DH intensity at the sample arm. The upper diagrams each show an image before phase cancellation. The lower diagrams each show an image after phase cancellation. It should be noted that FIG. 7B and FIG. 7C each show an image without irradiation of the reference light.

Silica beads each provide a large phase shift that is larger than 1 rad. Accordingly, silica beads cannot be considered to be weak-phase objects. Accordingly, there is only a small difference in the intensity between the upper diagrams shown in FIG. 7B and FIG. 7C. That is to say, even in a case in which DF measurement is employed, the light intensity to be irradiated to the sample cannot be increased.

In contrast, in a case in which phase cancellation is employed, this allows the phase distribution that occurs due to the microbeads to be canceled. This allows the maximum phase in the field of view to be suppressed to 0.1 rad or less. With this, as shown in the lower diagram shown in FIG. 7B, this allows the DF image intensity to be reduced by 1/30 or less. Accordingly, such an arrangement allows the illumination light intensity to be increased up to 30 times or more.

Next, quantitative phase imaging was investigated. FIG. 8A through FIG. 8D are diagrams showing the experimental results. FIG. 8A and FIG. 8B show the phase distributions acquired by DFDH measurement and DH measurement. It can be clearly understood that both experimental results are in good agreement. The QPI reconstruction can be provided by combining the object light information originating from the sample in DFDH measurement and the non-scattered light component information measured using the DH method without the sample.

It has been confirmed that the light intensity to be irradiated to the sample can be changed without causing the occurrence of saturation in the image sensor according to the maximum phase in the field of view. Specifically, phase objects having a size on the order of 3 μm that provide phase values (0.16, 0.33, 0.56) that correspond to the maximum phase in the field of view were input to the spatial light modulator 108, and the change in the amount of light that can be irradiated to the sample was measured according to these values. FIG. 8C is a diagram showing the relation between the maximum phase in the field of view and the maximum intensity allowed as illumination light. Based on the results, it has been found that the amount of light that can be irradiated to the sample can be increased to $1/\theta_{max}^2$ of that in DH measurement.

Next, in the DFDH measurement, the dependance of the detection sensitivity on $\theta_{max}$ was investigated. FIG. 8D is a diagram showing the relation between the light intensity irradiated to the sample and the phase detection sensitivity. The detection sensitivity is calculated by taking the difference between adjacent phase images for 25 frames and calculating the average value of the time standard deviations in the field of view as noise. In the DH method, even in a case in which a sample exists, only a position shift occurs in the interference fringe. Accordingly, the light intensity that can be irradiated to the sample is not changed according to the maximum phase value in the field of view. This provides a constant detection sensitivity of 6.01 mrad. In contrast, the detection sensitivity provided using the PC-DFDH method matches a curve obtained by substituting $\delta^{DH}_{mn}$=6.01 mrad into Expression (3). It can be understood that this provides improved detection sensitivity according to an increase of the light intensity.

Figure 9A:
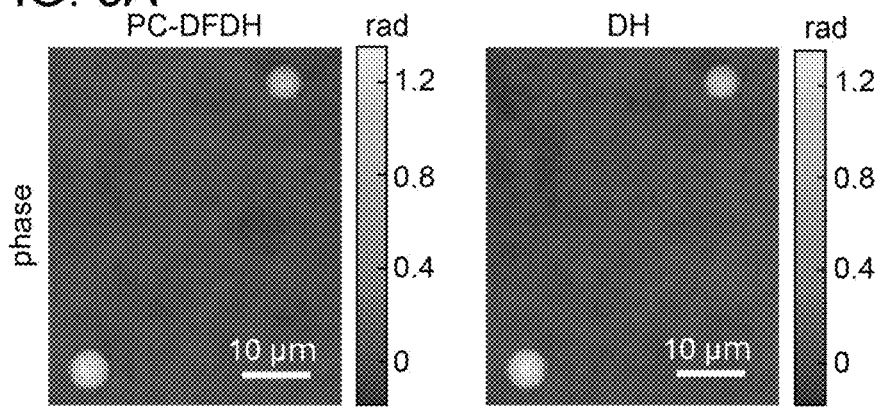
FIG. 9A through FIG. 9C are diagrams showing experimental results.
Figure 9B:
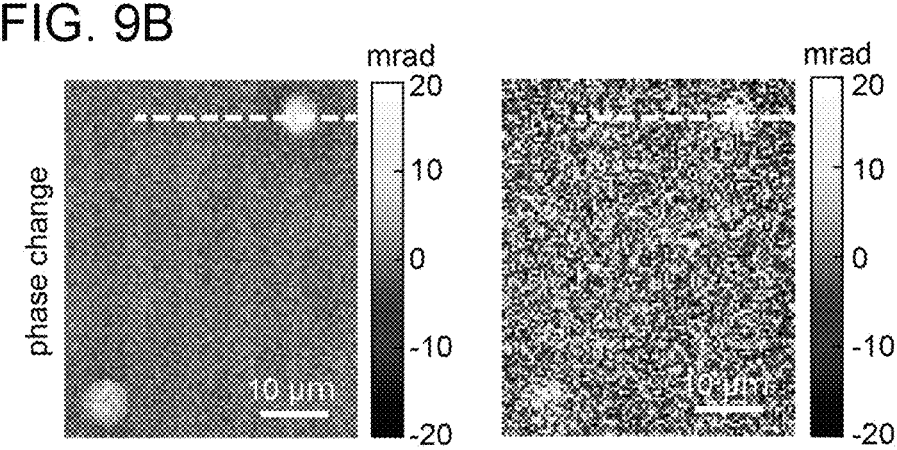
Figure 9C:
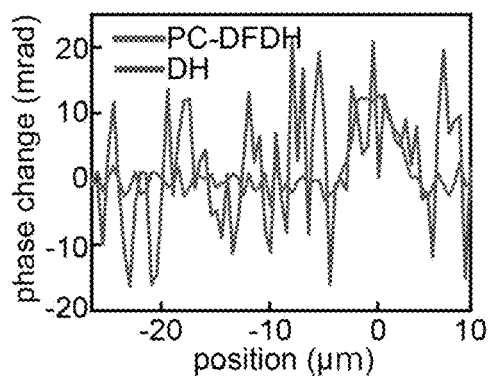

Next, description will be made regarding the investigation results with respect to the dynamic range expansion. For the verification, a mid-infrared (MIR) photothermal phase imaging experiment was performed. FIG. 9A through FIG. 9C are diagrams showing the experimental results. With photothermal phase imaging, the change of the temperature of a sample that occurs due to the absorption of excitation light and the accompanying change of the refraction index, i.e., the phase change that occurs in the detection light, are measured. Accordingly, by calculating the difference between the phase images of the on state of the excitation light and the off state thereof, such an arrangement is capable of acquiring information with respect to the amount of absorption of the excitation light. In this experiment, 5-μm silica beads were immersed in matching oil. Furthermore, an infrared pulse laser having a wavelength (1045 cm$^{-1}$) that resonates with Si—O stretching vibration was employed as the incident excitation light. FIG. 9A shows a reconstructed phase image acquired by PC-DFDH and a phase image acquired by DH. By applying the phase cancellation, this allows the maximum phase to be reduced to on the order of 0.1 rad. In DFDH, light having an intensity of 38 times the intensity to be used in DH is irradiated to the sample. FIG. 9A and FIG. 9C show the change of the phase image that occurs due to the absorption of the excitation light (i.e., the difference between the on state and the off state). In DH, phase change is buried in noise. In contrast, the PC-DFDH method allows the phase change to be detected. The noise floor is 6.6 times lower. This allows both the original phase distribution (FIG. 9A) and the small phase change (FIG. 9B) to be detected. It can be understood that this allows the dynamic range of the phase imaging to be expanded.

Example 2

Figure 10:
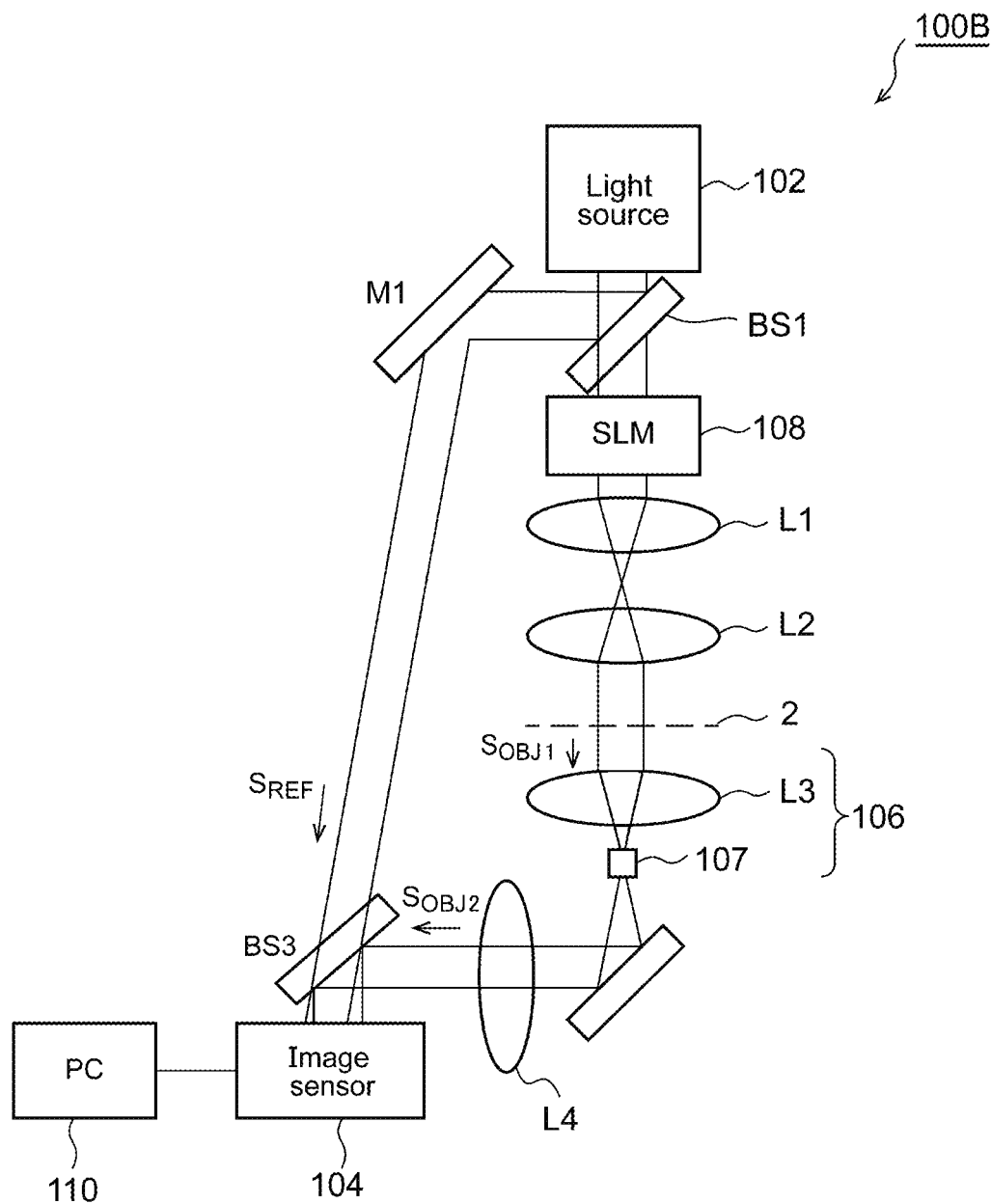
FIG. 10 is a diagram showing a phase imaging apparatus according to an example 2.

FIG. 10 is a diagram showing a phase imaging apparatus 100B according to an example 2. The phase imaging apparatus 100B has the same configuration as that in the example 1 except that the position of the spatial light modulator 108 in the example 1 is changed to a position on the conjugate plane in front of the sample 2.

Example 3

Figure 11:
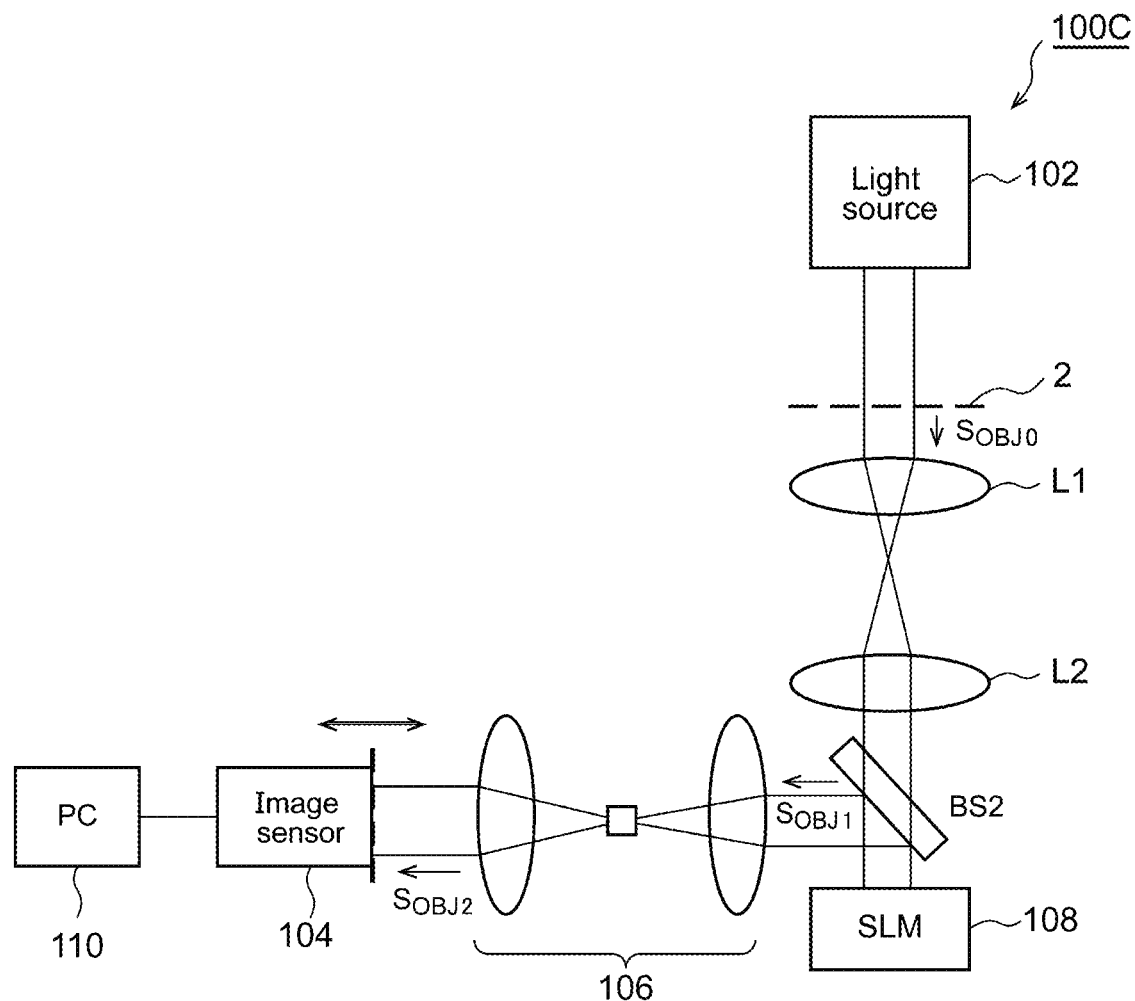
FIG. 11 is a diagram showing a phase imaging apparatus according to an example 3.

FIG. 11 is a diagram showing a phase imaging apparatus 100C according to an example 3. The phase imaging apparatus 100C is configured as an inline-type digital holography apparatus using a phase retrieval method. In this example, instead of irradiating reference light, object light is measured multiple times while shifting the position of the image sensor 104.

Also, the present invention is applicable to an inline-type digital holography apparatus using a phase shift method. In this case, the reference light is incident to the image sensor in the same axial direction as the object light, and multiple holograms are recorded while shifting the phase of the reference light. Subsequently, the images are subjected to calculation so as to acquire a complex amplitude light image.

Example 4

Figure 12:
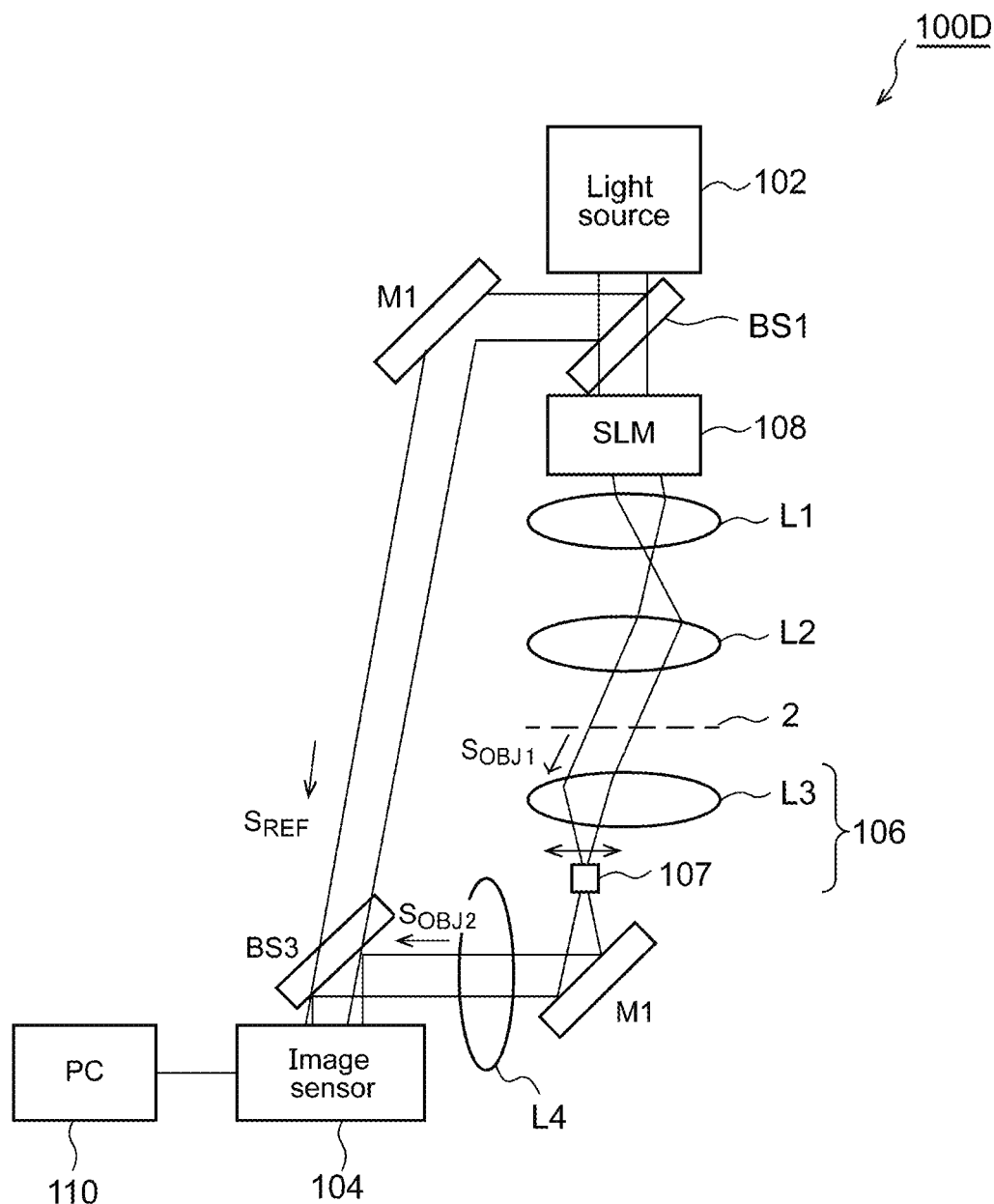
FIG. 12 is a diagram showing a phase imaging apparatus according to an example 4.

FIG. 12 is a diagram showing a phase imaging apparatus 100D according to an example 4. The phase imaging apparatus 100D is configured as an optical diffraction tomography and synthetic aperture imaging apparatus configured to irradiate patterned illumination light $S_{ILL}$ to a sample while changing the irradiation angle. A phase pattern such as a grating is supplied to the spatial light modulator 108, and the illumination light is irradiated to the sample 2 from an oblique direction. The phase information is measured at several angles, thereby allowing three-dimensional information (refraction index information) or a high-spatial-resonation quantitative phase image to be acquired. It should be noted that such techniques may be supported regardless of the presence or absence of the reference light.

In this apparatus, a pattern for phase cancellation is input to the spatial light modulator 108 at the same time. This allows the present invention to be applied to such an apparatus.

It should be noted that, with this method, the position of the non-scattered light component on the Fourier plane of the dark-field optical system 106 changes according to the illumination angle. Accordingly, the mask 107 may be configured as a movable mask that moves according to the position of the non-scattered light component. Alternatively, instead of the mask 107, a digital micromirror device (DMD) may be employed. With this, the on/off state of each pixel may be controlled according to the position of the non-scattered light components.

Example 5

Figure 13:
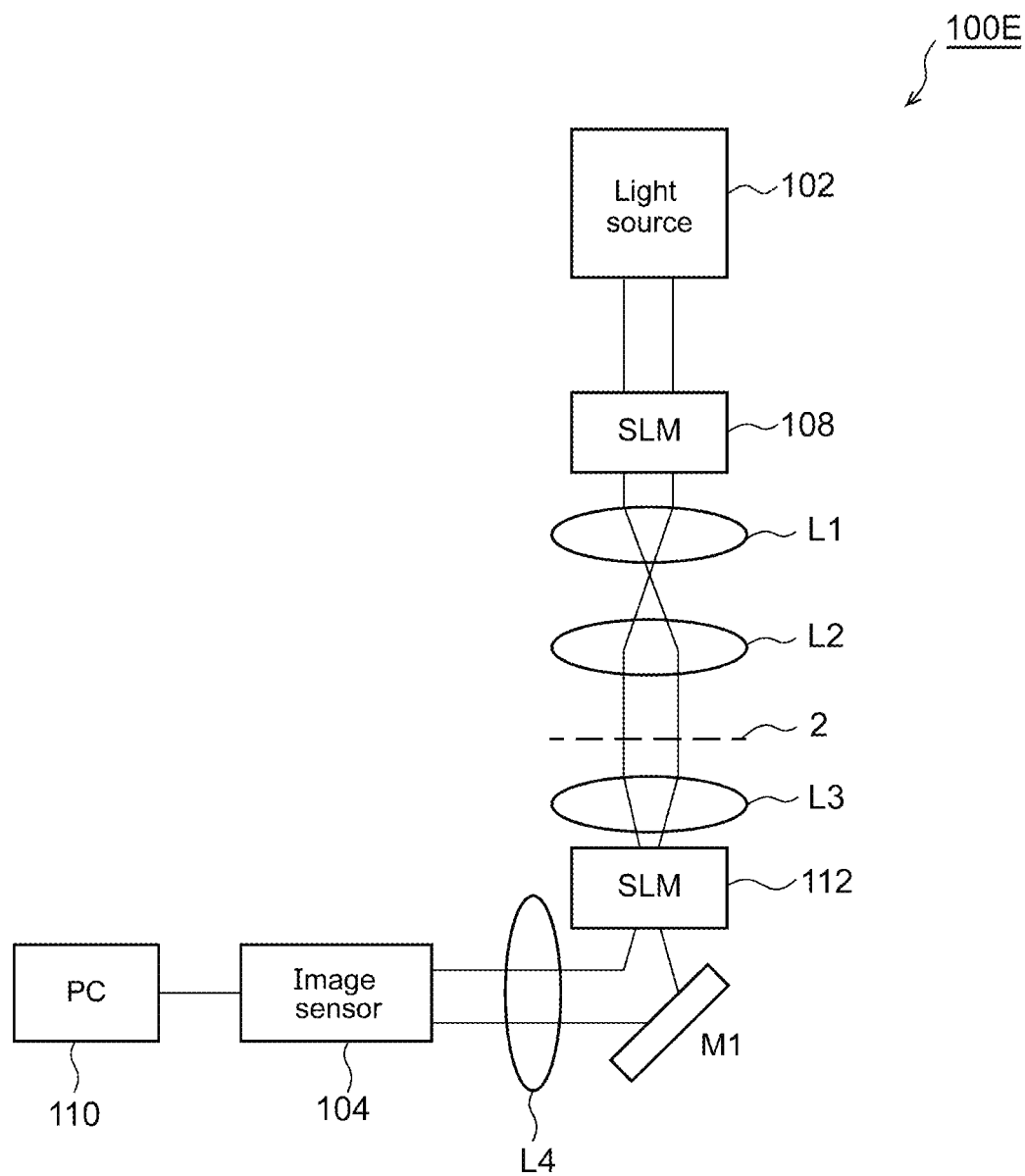
FIG. 13 is a diagram showing a phase imaging apparatus according to an example 5.

FIG. 13 is a diagram showing a phase imaging apparatus 100E according to an example 5. The phase imaging apparatus 100E is configured as a spatial light interference microscopy (SLIM) type apparatus. A first spatial light modulator 108 is provided on a plane conjugate to the sample plane so as to be capable of canceling the phase delay originating from the sample 2. A second spatial light modulator 112 attenuates the intensity of the non-scattered light component of the object light $S_{OBJ}$ including the phase information originating from the sample 2, and shifts the phase thereof. The image sensor 104 records a hologram based on the object light $S_{OBJ}$.

For example, the second spatial light modulator 112 may be configured as a complex amplitude modulation SLM so as to adjust both the non-scattered light component intensity of the object light and the phase thereof. That is to say, in this case, the phase modulator 112 has both a function as the phase modulator in SLIM imaging and a function as the dark-field optical system 106.

Alternatively, the second spatial light modulator 112 may be configured as two separate devices, i.e., a device for phase adjustment and a device for intensity adjustment. In this case, a phase modulator may be arranged at the position of the second spatial light modulator 112 shown in FIG. 13 so as to provide only phase adjustment. Furthermore, two lenses may be provided as additional components behind it so as to form a conjugate plane with respect to the phase modulator. A device configured to provide non-scattered light component intensity adjustment may be inserted on the conjugate plane thus formed.

While the preferred embodiments of the present invention have been described using specific terms, such description is for illustrative purposes only, and it is to be understood that changes and variations may be made without departing from the spirit or scope of the appended claims.

What is claimed is:

1. A phase imaging apparatus comprising:
   a spatial light modulator provided on a plane conjugate to a sample plane on which a sample is to be placed, and structured to be capable of spatially modulating illumination light irradiated to the sample or object light that has passed through or that has been reflected by the sample;
   a dark-field optical system structured to remove a non-scattered light component included in first object light affected by the spatial light modulator so as to generate second object light;
   an image sensor structured to record a hologram with respect to the second object light; and
   a calculation processing apparatus structured to combine complex amplitude information based on a modulation pattern supplied to the spatial light modulator and complex amplitude information based on the hologram with respect to the second object light so as to acquire a phase distribution originating from the sample.

2. The phase imaging apparatus according to claim 1, wherein the modulation pattern is generated based on a hologram with respect to third object light recorded by the image sensor in a state in which the dark-field optical system is disabled and a flat pattern is supplied to the spatial light modulator.

3. The phase imaging apparatus according to claim 1, wherein the modulation pattern is optimized such that an intensity of light incident to the image sensor is minimized in a state in which the dark-field optical system is enabled.

4. The phase imaging apparatus according to claim 1, wherein the modulation pattern is optimized such that a non-scattered light component of the second object light is maximized.

5. The phase imaging apparatus according to claim 1, wherein the dark-field optical system comprises a focusing optical system and a mask provided on a Fourier plane of the focusing optical system.

6. The phase imaging apparatus according to claim 1, structured as a digital holography apparatus and structured to measure an interference fringe formed on the image sensor due to the object light and reference light.

7. The phase imaging apparatus according to claim 1, structured as an inline-type digital holography apparatus structured to shift a position of the image sensor.

8. The phase imaging apparatus according to claim 1, structured as an optical diffraction tomography or synthetic aperture imaging apparatus structured to irradiate patterned illumination light while changing an irradiation angle, wherein the spatial light modulator is also employed as a patterning device for the illumination light.

9. The phase imaging apparatus according to claim 8, wherein the dark-field optical system comprises a focusing optical system, and a digital micromirror device (DMD) or a movable mask provided on a focal plane of the focusing optical system.

10. A spatial light interference microscopy (SLIM) type phase imaging apparatus comprising:
    a first spatial modulator provided on a plane conjugate to a sample plane on which a sample is to be placed, and structured to cancel a phase delay that occurs due to the sample;
    a second spatial modulator structured to attenuate an intensity of a non-scattered light component of object light including phase information originating from the sample, and to shift a phase of the non-scattered light component;
    an image sensor structured to record a hologram with respect to the object light; and
    a calculation processing apparatus structured to combine complex amplitude information based on a modulation pattern supplied to the spatial light modulator and complex amplitude information based on a hologram with respect to the object light so as to acquire a phase distribution originating from the sample.

11. A phase imaging method comprising:
- inserting a spatial light modulator in a plane conjugate to a sample plane on which a sample is to be placed so as to spatially modulate illumination light to be irradiated to the sample or object light including phase information originating from the sample;
- removing a non-scattered light component of the object light;
- an image sensor structured to record a hologram based on the object light;
- recording a hologram based on the object light by means of the image sensor in a state in which a predetermined modulation pattern is supplied to the spatial light modulator; and
- combining complex amplitude information based on the predetermined modulation pattern and complex amplitude information based on the hologram recorded by the image sensor, so as to acquire the phase information.

12. The phase imaging method according to claim 11, wherein the predetermined modulation pattern is generated based on the hologram in a state in which a flat pattern is supplied to the spatial light modulator such that the non-scattered light component is not removed.

* * * * *